US012011708B2

(12) United States Patent
He et al.

(10) Patent No.: US 12,011,708 B2
(45) Date of Patent: Jun. 18, 2024

(54) ORGANIC FRAME MATERIAL HAVING COBALT-CONTAINING ISOPOLY-MOLYBDIC ACID METAL, METHOD OF MANUFACTURING THE SAME, AND APPLICATION THEREOF

(71) Applicant: Changzhou University, Changzhou (CN)

(72) Inventors: Mingyang He, Changzhou (CN); Shengchun Chen, Changzhou (CN); Qun Chen, Changzhou (CN); Junfeng Qian, Changzhou (CN); Meijun Wei, Changzhou (CN); Chengpeng Zhang, Changzhou (CN)

(73) Assignee: Changzhou University, Changzhou (CN)

( * ) Notice: Subject to any disclaimer, the term of this patent is extended or adjusted under 35 U.S.C. 154(b) by 7 days.

(21) Appl. No.: 17/873,184

(22) Filed: Jul. 26, 2022

(65) Prior Publication Data

US 2023/0158477 A1 May 25, 2023

(30) Foreign Application Priority Data

Nov. 25, 2021 (CN) .......................... 202111411608.X (51) Int. Cl.
*B01J 23/88* (2006.01)
*B01J 31/16* (2006.01)
(Continued)

(52) U.S. Cl.
CPC ........... *B01J 23/88* (2013.01); *B01J 31/1691* (2013.01); *B01J 37/04* (2013.01); *B01J 37/08* (2013.01); *C08G 63/823* (2013.01)

(58) Field of Classification Search
CPC ...... B01J 23/88; B01J 23/882; B01J 31/1691; B01J 37/04; B01J 37/08; B01J 31/0244;
(Continued)

(56) References Cited

U.S. PATENT DOCUMENTS 4,052,988 A 10/1977 Doddi et al.
5,652,331 A 7/1997 Forschner et al.
(Continued)

FOREIGN PATENT DOCUMENTS

CN 105820182 A * 8/2016 .......... B01J 31/2217
CN 107556485 A * 1/2018 .......... C07D 263/58
(Continued)

OTHER PUBLICATIONS

Kricheldorf H.R., Damrau D.O. Macrol. Polylactones, 42. Zn L-lactate-catalyzed polymerizations of 1,4-dioxan-2-one, Chem. Phys. 1998, 199, 1089-1097.
(Continued)

*Primary Examiner* — Patricia L. Hailey
(74) *Attorney, Agent, or Firm* — IDEA Intellectual Limited; Margaret A. Burke; Sam T. Yip (57) ABSTRACT

An organic frame material having a cobalt-containing isopoly-molybdic acid metal, a method of manufacturing the same, and applications thereof are provided. The organic frame material having a cobalt-containing isopoly-molybdic acid metal includes a three-dimensional network structure comprising cobalt ions coordinated with 2,3,5,6-tetrafluoro-bis (1,2,4-triazole-1-methyl) benzene ligands and trinuclear molybdate anions. The organic frame material having a cobalt-containing isopoly-molybdic acid metal has higher catalytic activity towards the bulk ring-opening of p-dioxanone. The resulting poly(p-dioxanone) has a weight average molecular weight exceeding 70,000 and is capable of being applied in the field of high polymer materials.

9 Claims, 3 Drawing Sheets

(51) Int. Cl.
*B01J 37/04* (2006.01)
*B01J 37/08* (2006.01)
*C08G 63/82* (2006.01)

(58) Field of Classification Search
CPC ...... B01J 31/181; C08G 63/823; C08G 63/08; C01P 2002/00; C01P 2002/30
USPC ........ 502/325, 313, 321; 528/354, 357, 503; 525/411, 415; 549/274
See application file for complete search history.

(56) References Cited

U.S. PATENT DOCUMENTS

| | | | |
|---|---|---|---|
| 5,717,059 | A | 2/1998 | Forschner |
| 5,869,597 | A | 2/1999 | Newman, Jr. et al. |
| 11,306,200 | B2 * | 4/2022 | Chen ...................... B29C 48/92 |
| 11,555,043 | B2 * | 1/2023 | Chen ........................ C07F 1/04 |
| 2023/0159699 | A1 * | 5/2023 | He ........................ C07F 11/005 528/357 |
| 2023/0167236 | A1 * | 6/2023 | Chen ..................... C08G 63/08 528/277 |

FOREIGN PATENT DOCUMENTS

| | | | | |
|---|---|---|---|---|
| CN | 112563522 | A | * 3/2021 | ......... B82Y 31/2217 |
| CN | 113929924 | A | * 1/2022 | ............. C08G 63/08 |
| EP | 0691359 | A2 | 1/1996 | |
| WO | 9721753 | A1 | 6/1997 | |

OTHER PUBLICATIONS

Raquez J.-M., et al., Some Thermodynamic, Kinetic, and Mechanistic Aspects of the Ring-Opening Polymerization of 1,4-Dioxan-2-one Initiated by Al(OiPr)3 in Bulk, macromolecules 2001, 34, 8419-8425.

Yang K.-K., et al., AlEt3-H2O-H3PO4 catalyzed polymerizations of 1, 4-dioxan-2-one, Polymer. Bull. 2005, 54, 187-193.

Zhu X.-L., et al., Ring-opening polymerization of 1,4-dioxan-2-one initiated by lanthanum isopropoxide in bulk, Polymer. Sci. Pol. Chem. 2008, 46, 5214-5222.

\* cited by examiner

ID OF THE INVENTION

The invention relates to the technical field of catalysts. In particular, it relates to an organic frame material having cobalt-containing isopoly-molybdic acid metal, a method of manufacturing the same, and an application thereof.

BACKGROUND OF THE INVENTION

Poly(p-dioxanone) (PPDO) is an aliphatic polyester ether having excellent biocompatibility, bio-absorbability and drug permeability. PPDO has a special ether bond in its molecular chain. The special ether bond contributes to the strength of PPDO molecule and durability. Because it has a high molecular weight, PPDO can be used as surgical sutures and materials for bone plates and tissue repair. Compared with biodegradable aliphatic polyesters such as polyglycolic acid, polylactic acid and polycaprolactone, PPDO has better monomer recoverability. Under reduced pressure in a temperature range between 150 and 250° C., the depolymerization of PPDO occurs, and the p-dioxanone monomer is obtained. In the right conditions, the monomer recovery rate is as high as 99%. The recovered monomer can be used to prepare PPDO. Therefore, PPDO is suitable for producing disposable plastic products.

PPDO is obtained from the ring-opening polymerization of the p-dioxane monomer (PDO). In order to obtain high molecular weight PPDO, two synthetic methods can be used: a one-step synthesis method by direct ring-opening polymerization, or a two-step synthesis method of prepolymerization and chain extension. Forschener et al. used stannous octanoate as a catalyst and dodecanol as a cocatalyst to effect ring-opening polymerization of PDO. When the ratio of the monomer to catalyst is 10,000:1, the molecular weight of PPDO is 81,000, but its conversion rate is only 67%. (U.S. Pat. Nos. 5,652,331, 5,717,059, and WO9721753). Jamiokowski et al. first synthesized low-molecular-weight PPDO with stannous octanoate as a catalyst, and then they prepared high molecular weight PPDO via solid-state polymerization. The resulting high-molecular-weight PPDO has an intrinsic viscosity of 2.3-8 dl/g (EP0691359 and U.S. Pat. No. 5,869,597). Raquez et al. used aluminum tri-isopropoxide as a catalyst to induce ring-opening polymerization of PDO. The highest intrinsic viscosity of the polymerization product was only 0.77 dl/g, and the monomer conversion rate was only 70% (Raquez J.-M., Degée P., Narayan R., Dubois P. *Macromolecules* 2001, 34, 8419-8425). Doddi et al. used diethylzinc, which is rather unstable, to catalyze the ring-opening polymerization of PDO. The conditions for this polymerization were strict. After 72 hours of polymerization, the molecular weight of the product was also low (intrinsic viscosity was 0.7 dl/g) (U.S. Pat. No. 4,052,988). Kricheldorf et al. effected ring-opening polymerization of PDO by zinc lactate. At 100° C., when the ratio of the monomer to catalyst was 2,000:1, the viscosity of the polymer reached 0.95 dl/g after 14 days of reaction. However, the yield was only 62% (Kricheldorf H. R., Damrau D. O. *Macrol. Chem. Phys.* 1998, 199, 1089-1097). Wang Yuzhong et al. used a triethyl aluminum phosphate aqueous salt system, lanthanum isopropoxide and other catalysts for ring-opening polymerization of PDO to prepare PPDO (Yang K.-K., Guo Y.-H., Wang Y.-Z., Wang X.-L., Zhou Q. Polymer. Bull. 2005, 54, 187-193, and Zhu X.-L., Wu G., Qiu Z.-C., Zhou Y., Gong J., Yang K.-K., Wang Y.-Z. *J. Polymer. Sci. Pol. Chem.* 2008, 46, 5214-5222).

Due to the relatively stable structure of PDO, ring-opening polymerization is much more difficult than that of glycolide, lactide and caprolactone. The catalyst activity reported in patents and scientific literature is not high, and the polymerization time is long, the monomer conversion is low, and the molecular weight of the polymerization product is low. Therefore, there is a need to study and develop stable catalysts which demonstrate high catalytic activity for ring-opening polymerization of cyclic ester monomers and can be used in ring-opening polymerization of PDO.

SUMMARY OF THE INVENTION

This section is for the purpose of summarizing some aspects of embodiments of the invention and to briefly introduce some further embodiments. In this section, as well as in the abstract and the title of the invention of this application, simplifications or omissions may be made to avoid obscuring the purpose of the section, the abstract and the title, and such simplifications or omissions are not intended to limit the scope of the invention.

The present invention has been made in view of the above-mentioned problems to develop organic frame material having cobalt-containing isopoly-molybdic acid metal for catalyzing bulk ring-opening polymerization of PDO for the manufacturing of PPDO.

Accordingly, one aspect of the present invention provides an organic frame material having a cobalt-containing isopoly-molybdic acid metal for catalyzing bulk ring-opening polymerization of PDO for the manufacturing of PPDO, a method of manufacturing the same, and applications thereof. The method of manufacturing the organic frame material having a cobalt-containing isopoly-molybdic acid metal is simple and industrially feasible. This method has higher yield and good reproducibility. The organic frame material having a cobalt-containing isopoly-molybdic acid metal can catalyze the bulk ring-opening polymerization of PDO in the absence of alcohol initiators. The resulting PPDO has a weight average molecular weight exceeding 70,000 and a molecular distribution index smaller than 1.5. This PPDO has great potential in medical polymer material.

One aspect of the present invention provides an organic frame material having a cobalt-containing isopoly-molybdic acid metal including a three-dimensional network structure that comprises cobalt ions coordinated with 2,3,5,6-tetrafluoro-bis (1,2,4-triazole-1-methyl) benzene ligands and trinuclear molybdate anions. The chemical formula of the three-dimensional network structure is [Co (tfbtb) (Mo$_3$O$_{10}$) (H$_2$O)]. The tfbtb is a 2,3,5,6-tetrafluoro-bis (1,2,4-triazole-1-methyl) benzene ligand, and (Mo$_3$O$_{10}$) is a trinuclear molybdate anion.

In a further embodiment of the present invention, the three-dimensional network structure is a triclinic crystal system, the space group is P-1, the molecular formula is C$_{12}$H$_{10}$CoF$_4$Mo$_3$N$_6$O$_{11}$, the molecular weight is 827.94, the cell parameters are a=8.0162(5) Å, b=8.9177(8)Å, c=15.5957(10) Å, α=106.519(7)°, β=92.137(5)°, γ=99.520 (6)°, and the cell volume is 1049.94(14)Å$^3$, Z=2.

Another aspect of the present invention provides a method of manufacturing the organic frame material having a cobalt-containing isopoly-molybdic acid metal including providing a composition. The composition includes a cobalt salt, sodium molybdate dihydrate, 2,3,5,6-tetrafluoro-bis (1,2,4-triazole-1-methyl) benzene and a solvent. Next, the composition is heated to obtain the organic frame material having cobalt-containing isopoly-molybdic acid metal.

In a further embodiment of the present invention, the amount of the cobalt salt to the amount of the sodium molybdate dihydrate is between 1:1 and 1:2, the ratio of the amount of the 2,3,5,6-tetrafluoro-bis (1,2,4-triazole-1-methyl) benzene to the amount of the cobalt salt is between 1:2 and 1:6, and the ratio of the amount of the 2,3,5,6-tetrafluoro-bis (1,2,4-triazole-1-methyl) benzene to the amount of the sodium molybdate dihydrate is between 1:1 and 1:5.

In a further embodiment of the present invention, the cobalt salt is selected from the group consisting of one or more of cobalt chloride hexahydrate, cobalt acetate tetrahydrate, cobalt sulfate heptahydrate and cobalt nitrate hexahydrate.

In a further embodiment of the present invention, the solvent is water, and every 0.1 mmol of 2,3,5,6-tetrafluoro-bis (1,2,4-triazole-1-methyl) benzene corresponds to 3 to 10 ml of water.

In a further embodiment of the present invention, the temperature during the heating phase ranges between 120 and 160° C. and the duration ranges between 12 and 36 hours.

Still another aspect of the present invention provides a method of catalyzing a ring-opening polymerization of p-dioxanone (PDO) for the preparation of poly(p-dioxanone) (PPDO). The method includes effecting a bulk ring-opening polymerization on the organic frame material having cobalt-containing isopoly-molybdic acid metal of claim 1 or 2 and PDO under a reaction temperature to obtain PPDO.

In a further embodiment of the present invention, the molar ratio between the organic frame material having cobalt-containing isopoly-molybdic acid metal and the PDO is between 1:2,000 and 1:8,000.

In a further embodiment of the present invention, the weight average molecular weight of the PPDO is between 60,000 and 90,000, the molecular weight distribution index of the PPDO is between 1.3 and 1.5, and the polydioxanone is capable of being incorporated into medical polymer materials.

The present invention provides the following advantages.

The organic frame material having a cobalt-containing isopoly-molybdic acid metal is heat stable. The synthesis method of the organic frame material having a cobalt-containing isopoly-molybdic acid metal is simple and highly reproducible. The organic frame material having a cobalt-containing isopoly-molybdic acid metal has higher catalytic activity towards the bulk ring-opening of p-dioxanone, and the resulting poly(p-dioxanone) has a weight average molecular weight exceeding 70,000. The poly(p-dioxanone) can be used in the field of high polymer materials.

BRIEF DESCRIPTION OF THE DRAWINGS

In order to more clearly illustrate the technical solutions of the embodiments of the present invention, the drawings needed to be used in the description of the embodiments will be briefly introduced below. It is obvious that the drawings in the following description are only some embodiments of the present invention, and it is obvious for those skilled in the art to obtain other drawings based on these drawings without inventive exercise, in which.

DETAILED DESCRIPTION

In order to make the aforementioned objects, features and advantages of the present invention comprehensible, embodiments accompanied with figures are described in detail below.

In the following description, numerous specific details are set forth in order to provide a thorough understanding of the present invention, but the present invention may be practiced in other ways than those specifically described and will be readily apparent to those of ordinary skill in the art without departing from the spirit of the present invention, and therefore the present invention is not limited to the specific embodiments disclosed below.

Furthermore, reference herein to "one embodiment" or "an embodiment" means that a particular feature, structure, or characteristic described in connection with the embodiment is included in at least one implementation of the invention. The appearances of the phrase "in one embodiment" in various places in the specification are not necessarily all referring to the same embodiment, nor are separate or alternative embodiments mutually exclusive of other embodiments.

Example 1

Cobalt acetate tetrahydrate (99.6 mg, 0.4 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 140° C. for 1 day to undergo reaction, it is slowly cooled to room temperature at a rate of 5°/hour to obtain purple block crystals in a yield of 58% (48.1 mg, based on tfbtb).

The organic frame material having a cobalt-containing isopoly-molybdic acid metal prepared in Example 1 is characterized as follows.

A Nicolet ESP 460 instrument is used for infrared data determination. Infrared data (KBr, $cm^{-1}$) are 3448 br, 3159 w, 3129 w, 2971 w, 1736 w, 1522 m, 1533 m, 1489 m, 1432 w, 1394 w, 1351 w, 1316 w, 1284 m, 1212 w, 1188 w, 1126 m, 1033 m, 1003 w, 988 m, 953 s, 934 s, 903 s, 859 s, 934 s, 903 s, 871 m, 859 m, 827 s, 720 s, 676 s, 610 s, 488 m, 447 m.

Figure 1:
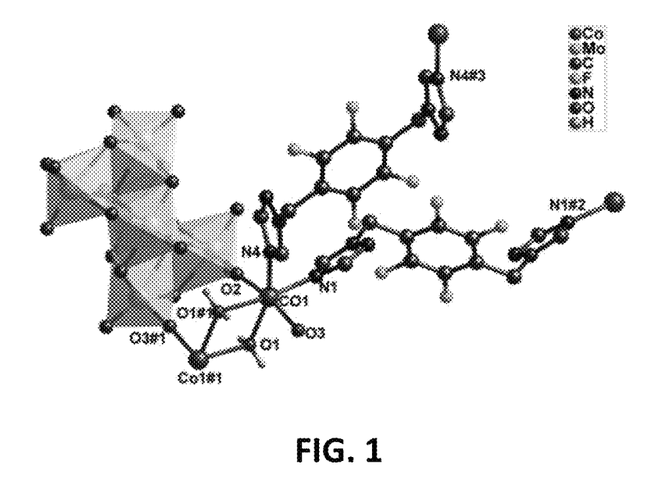
FIG. 1 shows the coordination environment of cobalt ions in the organic frame material having a cobalt-containing isopoly-molybdic acid metal of Example 1 according to an embodiment of the present invention.
Figure 2:
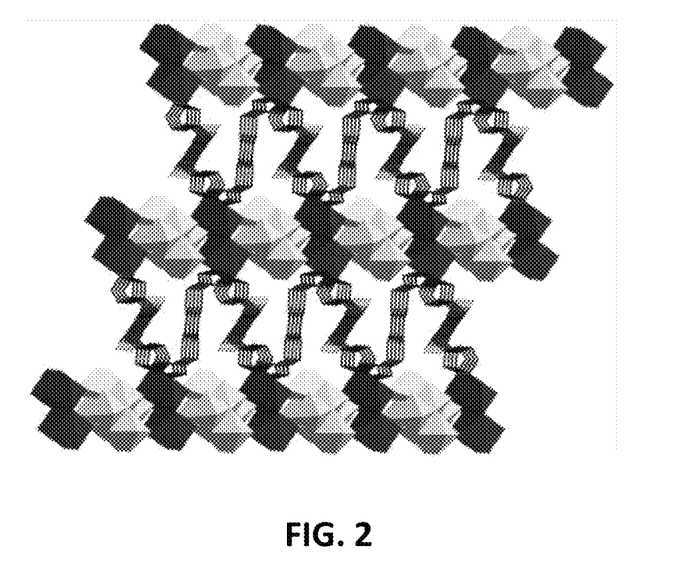
FIG. 2 is a three-dimensional network structure diagram of the organic frame material having a cobalt-containing isopoly-molybdic acid metal of Example 1 according to an embodiment of the present invention.

The crystal structure is determined by Bruker Apex II CCD diffractometer with graphite monochromated Mo Kα ray (λ, =0.71073 Å) at 293(2)K by ω scanning to collect the diffraction points. The collected data were restored by a SAINT program and semi empirical absorption correction is performed by SADABS method. The structure analysis and refinement are completed by SHELLXS and SHELLXL of SHELLXTL program respectively. $F^2$ is modified by a full matrix least square method to obtain the coordinates and anisotropy parameters of all non-hydrogen atoms. All hydrogen atoms are theoretically fixed to the parent atom in the process of structural refinement, and the isotropic displacement parameter is slightly larger than the parent atom displacement parameter (C—H, 1.2 or N—H, 1.2 times). Table 1 shows detailed crystal measurement data. FIG. 1 shows the coordination environment of organic frame material having a cobalt-containing isopoly-molybdic acid metal. FIG. 2 shows the three-dimensional network structure of the organic frame material having a cobalt-containing isopoly-molybdic acid metal.

TABLE 1

| | |
|---|---|
| Molecular formula | $C_{12}H_{10}CoF_4Mo_3N_6O_{11}$ |
| Molecular weight | 827.94 |
| Crystal size | 0.22 mm × 0.18 mm × 0.16 mm |
| Crystallographic system | Triclinic |
| Space group | P $\bar{1}$ |
| Cell parameters | a = 8.0162(5) Å |
| | b = 8.9177(8) Å |
| | c = 15.5957(10) Å |
| | α = 106.519(7)° |
| | β = 92.137(5)° |
| | γ = 99.520(6)° |
| Volume | 1094.9(1) Å$^3$ |
| Number of repeating units in cell | 2 |
| Density (calculated) | 2.619 mg m$^{-3}$ |
| Absorption coefficient | 2.634 |
| Absorption correction | Semi-empirical |
| Refinement | Least square |
| $F^2$ base fit | 1.069 |
| Final R factor [I > 2 s(I)] | $R_1$ = 0.0452 |
| R factor (all data) | $R_1$ = 0.0599 |
| Residual error | 0.751 eÅ$^{-3}$, −0.937 eÅ$^{-3}$ |

Figure 3:
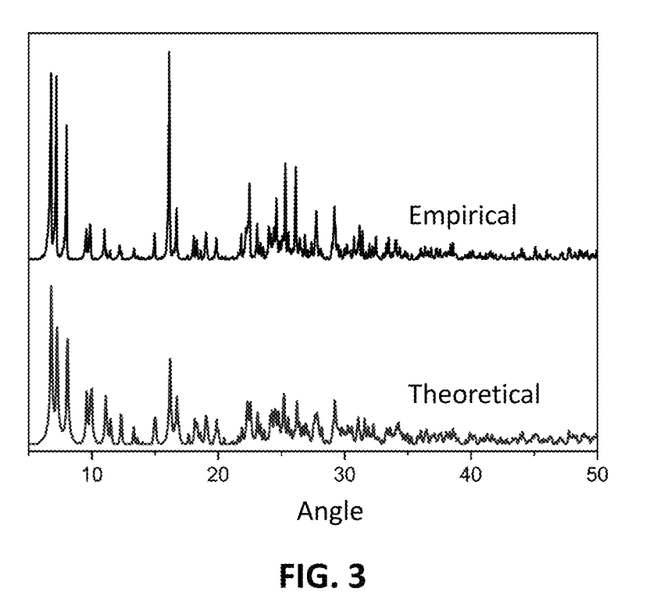
FIG. 3 is a powder diffraction diagram of the organic frame material having a cobalt-containing isopoly-molybdic acid metal of Example 1 according to an embodiment of the present invention.

A RIGAKU d/max-2500 instrument is used to characterize the phase purity of the organic frame material having cobalt-containing isopoly-molybdic acid metal, as shown in FIG. 3. The powder diffraction diagram of the organic frame material having cobalt-containing isopoly-molybdic acid metal shows that it has a reliable phase purity, which ensures its catalytic activity in the ring-opening copolymerization of p-dioxanone.

Figure 4:
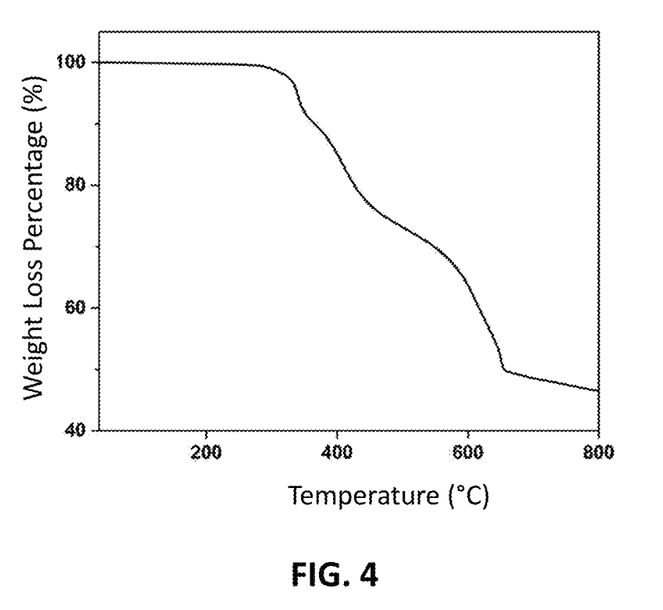
FIG. 4 is a thermogravimetric diagram of the organic frame material having a cobalt-containing isopoly-molybdic acid metal of Example 1 according to an embodiment of the present invention.

The thermal stability of the organic frame material having cobalt-containing isopoly-molybdic acid metal can be characterized by thermogravimetric analyzer (instrument model: NETZSCH/TG 209 F3). FIG. 4 shows the thermogravimetric diagram of the organic frame material having cobalt-containing isopoly-molybdic acid metal. The results show that the organic frame material having cobalt-containing isopoly-molybdic acid metal has high thermal stability even up to 300° C.

Example 2

Cobalt acetate tetrahydrate (149.4 mg, 0.6 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 140° C. for 1 day, it is slowly cooled to room temperature at a rate of 5° C./hour to obtain purple block crystals in a yield of 46% (38.1 mg, based on tfbtb).

Example 3

Cobalt acetate tetrahydrate (49.8 mg, 0.2 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 140° C. for 1 day, it is slowly cooled to room temperature at a rate of 5° C./hour to obtain purple block crystals in a yield of 28% (23.2 mg, based on tfbtb).

Example 4

Cobalt acetate tetrahydrate (99.6 mg, 0.4 mmol), tfbtb (31.1 mg, 0.1 mmol), sodium molybdate dihydrate (20.5 mg, 0.1 mmol) and deionized water (6 ml) are added to a 15 ml polytetrafluoroethylene autoclave. After this composition is heated at 140° C. for 1 day, it is slowly cooled to room temperature at a rate of 5° C./hour to obtain purple block crystals in a yield of 33% (27.4 mg, based on tfbtb).

Example 5

Cobalt acetate tetrahydrate (99.6 mg, 0.4 mmol), tfbtb (31.1 mg, 0.1 mmol), sodium molybdate dihydrate (102.5 mg, 0.5 mmol) and deionized water (6 ml) are added to a 15 ml polytetrafluoroethylene autoclave. After this composition is heated at 140° C. for 1 day, it is slowly cooled to room temperature at a rate of 5° C./hour to obtain purple block crystals in a yield of 21% (17.4 mg, based on tfbtb).

Example 6

Cobalt acetate tetrahydrate (74.7 mg, 0.3 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 140° C. for 1 day, it is slowly cooled to room temperature at a rate of 5° C./hour to obtain purple block crystals in a yield of 24% (19.9 mg, based on tfbtb).

Example 7

Cobalt acetate tetrahydrate (99.6 mg, 0.4 mmol), tfbtb (31.1 mg, 0.1 mmol), sodium molybdate dihydrate (164.0 mg, 0.8 mmol) and deionized water (6 ml) are added to a 15 ml polytetrafluoroethylene autoclave. After this composition is heated at 140° C. for 1 day, it is slowly cooled to room temperature at a rate of 5° C./hour to obtain purple block crystals in a yield of 29% (24.1 mg, based on tfbtb).

Example 8

Cobalt acetate tetrahydrate (99.6 mg, 0.4 mmol), tfbtb (31.1 mg, 0.1 mmol), sodium molybdate dihydrate (61.5 mg, 0.3 mmol) and deionized water (10 ml) are added to a 15 ml polytetrafluoroethylene autoclave. After this composition is heated at 140° C. for 1 day, it is slowly cooled to room temperature at a rate of 5° C./hour to obtain purple block crystals in a yield of 39% (32.3 mg, based on tfbtb).

Example 9

Cobalt acetate tetrahydrate (99.6 mg, 0.4 mmol), tfbtb (31.1 mg, 0.1 mmol), sodium molybdate dihydrate (61.5 mg, 0.3 mmol) and deionized water (3 ml) are added to a 15 ml polytetrafluoroethylene autoclave. After this composition is heated at 140° C. for 1 day, it is slowly cooled to room temperature at a rate of 5° C./hour to obtain purple block crystals in a yield of 23% (19.1 mg, based on tfbtb).

Example 10

Cobalt acetate tetrahydrate (99.6 mg, 0.4 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 160° C. for 1 day, it is slowly cooled to room temperature at a rate of 5° C./hour to obtain purple block crystals in a yield of 42% (34.8 mg, based on tfbtb).

Example 11

Cobalt acetate tetrahydrate (99.6 mg, 0.4 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 120° C. for 1 day, it is slowly cooled to room temperature at a rate of 5° C./hour to obtain purple block crystals in a yield of 28% (23.3 mg, based on tfbtb).

Example 12

Cobalt chloride hexahydrate (95.1 mg, 0.4 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 140° C. for 1 day, it is slowly cooled to room temperature at a rate of 5° C./hour to obtain purple block crystals in a yield of 31% (25.7 mg, based on tfbtb).

Example 13

Cobalt sulfate heptahydrate (112.5 mg, 0.4 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 140° C. for 1 day, it is slowly cooled to room temperature at a rate of 5° C./hour to obtain purple block crystals in a yield of 38% (31.5 mg, based on tfbtb).

Example 14

Cobalt nitrate hexahydrate (116.4 mg, 0.4 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 140° C. for 1 day, it is slowly cooled to room temperature at a rate of 5° C./hour to obtain purple block crystals in a yield of 40% (33.2 mg, based on tfbtb).

Example 15

Cobalt acetate tetrahydrate (99.6 mg, 0.4 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 140° C. for 12 hours, it is slowly cooled to room temperature at a rate of 5° C./hour to obtain purple block crystals in a yield of 33% (27.4 mg, based on tfbtb).

Example 16

Cobalt acetate tetrahydrate (99.6 mg, 0.4 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 140° C. for 36 hours, it is slowly cooled to room temperature at a rate of 5° C./hour to obtain purple block crystals in a yield of 36% (29.8 mg, based on tfbtb).

Example 17

Cobalt acetate tetrahydrate (99.6 mg, 0.4 mmol), tfbtb (31.1 mg, 0.1 mmol), sodium molybdate dihydrate (61.5 mg, 0.3 mmol) and deionized water (3 ml) are added to a 15 ml polytetrafluoroethylene autoclave. After this composition is heated at 160° C. for 1 day, it is slowly cooled to room temperature at a rate of 5° C./hour to obtain purple block crystals in a yield of 27% (22.4 mg, based on tfbtb).

Example 18

Cobalt acetate tetrahydrate (99.6 mg, 0.4 mmol), tfbtb (31.1 mg, 0.1 mmol), sodium molybdate dihydrate (61.5 mg, 0.3 mmol) and deionized water (10 ml) are added to a 15 ml polytetrafluoroethylene autoclave. After this composition is heated at 120° C. for 1 day, it is slowly cooled to room temperature at a rate of 5° C./hour to obtain purple block crystals in a yield of 22% (18.3 mg, based on tfbtb).

Example 19

Cobalt acetate tetrahydrate (99.6 mg, 0.4 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 120° C. for 12 hours, it is slowly cooled to room temperature at a rate of 5° C./hour to obtain purple block crystals in a yield of 21% (17.4 mg, based on tfbtb).

Example 20

Cobalt acetate tetrahydrate (99.6 mg, 0.4 mmol), tfbtb (31.1 mg, 0.1 mmol), sodium molybdate dihydrate (61.5 mg, 0.3 mmol) and deionized water (6 ml) are added to a 15 ml polytetrafluoroethylene autoclave. After this composition is heated at 160° C. for 36 hours, it is slowly cooled to room temperature at a rate of 5° C./hour to obtain purple block crystals in a yield of 25% (20.7 mg, based on tfbtb).

Comparative Example 1

Sodium molybdate dihydrate is replaced with another type of molybdate (such as ammonium molybdate or sodium phosphomolybdate, 0.3 mmol)). The other molybdate, cobalt acetate tetrahydrate (0.4 mmol), tfbtb (31.1 mg, 0.1 mmol) and deionized water (6 ml) are added into a 15 ml polytetrafluoroethylene autoclave, and they are slowly cooled to room temperature at a rate of 5° C./hour, after being heated at 140° C. for 1 day. The result is amorphous powders, and no crystal samples are suitable for X-ray single crystal analysis.

Comparative Example 2

Tfbtb is replaced with other nitrogen heterocyclic ligands (such as 1,2,4-triazole, 4-amino-1,2,4-triazole, 1-methyl-1, 2,4-triazole, 1,2,3-triazole or 4,4'-bipyridine, 0.1 mmol). The other nitrogen heterocyclic ligands, cobalt acetate tetrahydrate (99.6 mg, 0.4 mmol), sodium molybdate dihydrate (61.5 mg, 0.3 mmol) and deionized water (6 ml) are added to a 15 ml polytetrafluoroethylene autoclave. After the composition is heated at 140° C. for 1 day, it is slowly cooled to room temperature at the rate of 5° C./hour. The result is amorphous powders, and no crystal samples are suitable for X-ray single crystal analysis.

Comparative Example 3

Cobalt acetate tetrahydrate is replaced with other metal salts (such as copper sulfate, zinc nitrate, nickel nitrate, manganese chloride or ferric chloride, 0.4 mmol). The other metal salts, tfbtb (31.1 mg, 0.1 mmol), sodium molybdate dihydrate (61.5 mg, 0.3 mmol) and deionized water (6 ml) are added into a 15 ml polytetrafluoroethylene autoclave. After the composition is heated at 140° C. for 1 day, it is slowly cooled to room temperature at a rate of 5° C./hour. The result is amorphous powders, and no crystal samples are suitable for X-ray single crystal analysis.

Example 21

The properties of the organic frame material having cobalt-containing isopoly-molybdic acid metal of Example 1 are characterized in the process of catalyzing ring-opening polymerization of p-dioxanone.

2,041 mg p-dioxanone (20 mmol) and 3.31 mg catalyst of the organic frame material having cobalt-containing isopoly-molybdic acid metal (0.004 mmol) are added to Schlenk reaction tubes. The tubes are heated to 80° C. After 48 hours, poly(p-dioxanone) is obtained.

Figure 5:
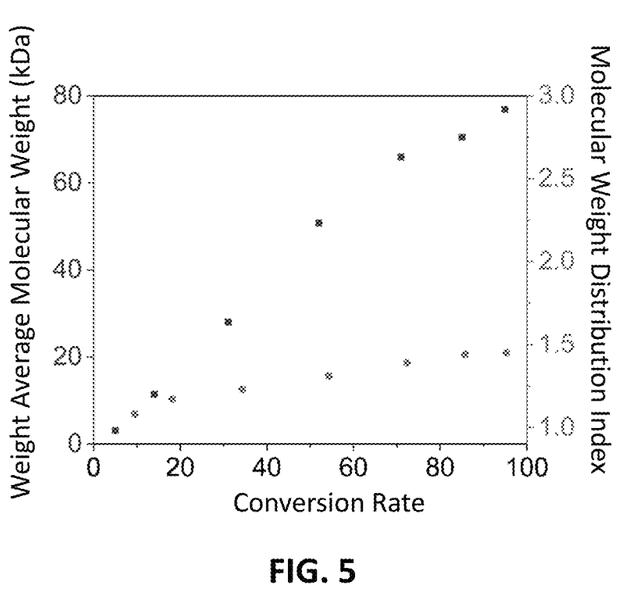
FIG. 5 is a schematic diagram of the relationship between the conversion rate of the ring-opening polymerization of p-dioxanone and the weight average molecular weight and molecular weight distribution index of PPDO prepared by the organic frame material having a cobalt-containing isopoly-molybdic acid metal of Example 1 according to an embodiment of the present invention.

The relationship between the conversion rate and the molecular weight of PPDO is determined by $^1$H NMR quantitative analysis (instrument model: Bruker AVANCE 400 MHz), as shown in FIG. 5. The $^1$H NMR quantitative analysis results show that the conversion rate of p-dioxanone is 100%.

Measurement of the molecular weight of PPDO: 7.0 mg of PPDO is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 76,850, and the molecular weight distribution index is approximately 1.48.

Test conditions: The column temperature is 40° C. The eluent is tetrahydrofuran. The flow rate is 0.6 ml/min. The detector is a RID-10A detector. Calibration: four different standardized polystyrene having molecular weight between ranging between 2,000 and 100,000 are used.

Example 22

2,041 mg p-dioxanone (20 mmol) and 3.31 mg catalyst of the organic frame material having cobalt-containing isopoly-molybdic acid metal (0.004 mmol) are added to Schlenk reaction tubes. The reaction is carried out at a constant 60° C. for 48 hours. After the polymerization is completed, it is cooled to room temperature. The product is dissolved in 20 ml of a mixed solvent of phenol and 1,1,2,2-tetrachloroethane. The catalyst (organic frame material having cobalt-containing isopoly-molybdic acid metal) is recovered by centrifugation. Then, 120 ml of methanol is added to the filtrate to precipitate the polymer. The polymer is dried in a vacuum at 45° C. to obtain the white PPDO product. The $^1$H NMR quantitative analysis results show that the conversion rate of p-dioxanone is 100%.

The molecular weight measurement method as discussed in Example 21 is used. The calculated weight average molecular weight of the PPDO is approximately 68,964, and the molecular weight distribution index is approximately 1.42.

Example 23

2,041 mg p-dioxanone (20 mmol) and 3.31 mg catalyst of the organic frame material having cobalt-containing isopoly-molybdic acid metal (0.004 mmol) are added to Schlenk reaction tubes. The reaction is carried out at a constant 60° C. for 48 hours. After the polymerization is completed, it is cooled to room temperature. The product is dissolved in 20 ml of a mixed solvent of phenol and 1,1,2,2-tetrachloroethane. The catalyst (organic frame material having cobalt-containing isopoly-molybdic acid metal) is recovered by centrifugation. Then, 120 ml methanol is added to the filtrate to precipitate the polymer. The polymer is dried in a vacuum at 45° C. to obtain the white PPDO product. The $^1$H NMR quantitative analysis results show that the conversion rate of p-dioxanone is 100%.

The molecular weight measurement method as discussed in Example 21 is used. The calculated weight average molecular weight of the PPDO is approximately 72,467, and the molecular weight distribution index is approximately 1.44.

Example 24

2,041 mg p-dioxanone (20 mmol) and 3.31 mg catalyst of the organic frame material having cobalt-containing isopoly-molybdic acid metal (0.004 mmol) are added to Schlenk reaction tubes. The reaction is carried out at a constant 80° C. for 24 hours. After the polymerization is completed, it is cooled to room temperature. The product is dissolved in 20 ml of a mixed solvent of phenol and 1,1,2,2-tetrachloroethane. The catalyst (organic frame material having cobalt-containing isopoly-molybdic acid metal) is recovered by centrifugation. Then, 120 ml of methanol is added to the filtrate to precipitate the polymer. The polymer is dried in a vacuum at 45° C. to obtain the white PPDO product. The $^1$H NMR quantitative analysis results show that the conversion rate of p-dioxanone is 100%.

The molecular weight measurement method as discussed in Example 21 is used. The calculated weight average molecular weight of the PPDO is approximately 66,793, and the molecular weight distribution index is approximately 1.38.

Example 25

2,041 mg p-dioxanone (20 mmol) and 3.31 mg catalyst of the organic frame material having cobalt-containing isopoly-molybdic acid metal (0.004 mmol) are added to Schlenk reaction tubes. The reaction is carried out at a constant 80° C. for 72 hours. After the polymerization is completed, it is cooled to room temperature. The product is dissolved in 20 ml of a mixed solvent of phenol and 1,1,2,2-tetrachloroethane. The catalyst (organic frame material having cobalt-containing isopoly-molybdic acid metal) is recovered by centrifugation. Then, 120 ml of methanol is added to the filtrate to precipitate the polymer. The polymer is dried in a vacuum at 45° C. to obtain the white PPDO product. The $^1$H NMR quantitative analysis results show that the conversion rate of p-dioxanone is 100%.

The molecular weight measurement method as discussed in Example 21 is used. The calculated weight average molecular weight of the PPDO is approximately 67,324, and the molecular weight distribution index is approximately 1.37.

Example 26

2,041 mg p-dioxanone (20 mmol) and 1.35 mg catalyst of the organic frame material having cobalt-containing isopoly-molybdic acid metal (0.0016 mmol) are added to Schlenk reaction tubes. The reaction is carried out at a constant 80° C. for 48 hours. After the polymerization is completed, it is cooled to room temperature. The product is dissolved in 20 ml of a mixed solvent of phenol and 1,1,2,2-tetrachloroethane. The catalyst (organic frame material having cobalt-containing isopoly-molybdic acid metal) is recovered by centrifugation. Then, 120 ml of methanol is added to the filtrate to precipitate the polymer. The polymer is dried in a vacuum at 45° C. to obtain the white PPDO product. The $^1$H NMR quantitative analysis results show that the conversion rate of p-dioxanone is 100%

The molecular weight measurement method as discussed in Example 21 is used. The calculated weight average molecular weight of the PPDO is approximately 71,354, and the molecular weight distribution index is approximately 1.45.

Example 27

2,041 mg p-dioxanone (20 mmol) and 5.31 mg catalyst of the organic frame material having cobalt-containing isopoly-molybdic acid metal (0.0064 mmol) are added to Schlenk reaction tubes. The reaction is carried out at a constant 80° C. for 48 hours. After the polymerization is completed, it is cooled to room temperature. The product is dissolved in 20 ml of a mixed solvent of phenol and 1,1,2,2-tetrachloroethane. The catalyst (organic frame material having cobalt-containing isopoly-molybdic acid metal) is recovered by centrifugation. Then, 120 ml of methanol is added to the filtrate to precipitate the polymer. The polymer is dried in a vacuum at 45° C. to obtain the white PPDO product. The $^1$H NMR quantitative analysis results show that the conversion rate of p-dioxanone is 100%

The molecular weight measurement method as discussed in Example 21 is used. The calculated weight average molecular weight of the PPDO is approximately 66,889, and the molecular weight distribution index is approximately 1.37.

Comparative Example 4

2,041 mg p-dioxanone (20 mmol) and 1.0 mg cobalt acetate tetrahydrate (0.004 mmol) are added to Schlenk reaction tubes. The reaction is carried out at a constant 80° C. for 48 hours. The $^1$H NMR quantitative analysis results show that the conversion rate of p-dioxanone is 47.2%.

The molecular weight measurement method as discussed in Example 21 is used. The calculated weight average molecular weight of the PPDO is approximately 13,985, and the molecular weight distribution index is approximately 1.98.

Comparative Example 5

2,041 mg p-dioxanone (20 mmol) and 1.25 mg tfbtb (0.004 mmol) are added to Schlenk reaction tubes. The reaction is carried out at a constant 80° C. for 48 hours. The $^1$H NMR quantitative analysis results show that the conversion rate of p-dioxanone by tfbtb is very low. The monomer conversion rate is smaller than 5%.

The molecular weight measurement method as discussed in Example 21 is used. The calculated weight average molecular weight of the PPDO is smaller than 1,000, and the molecular weight distribution index is approximately 1.11.

Comparative Example 6

2,041 mg p-dioxanone (20 mmol) and 0.97 mg sodium molybdate dihydrate (0.004 mmol) are added to Schlenk reaction tubes. The reaction is carried out at a constant 80° C. for 48 hours. The $^1$H NMR quantitative analysis results show that p-dioxanone is not converted, and there is no PPDO product detected.

The present invention provides an organic frame material having cobalt-containing isopoly-molybdic acid metal, method of manufacturing the same, and applications thereof. The present invention relates to the field of catalysts for poly(p-dioxanone). The chemical formula of the organic frame material is [Co (tfbtb) (Mo$_3$O$_{10}$) (H$_2$O)]. The tfbtb is a 2,3,5,6-tetrafluoro-bis (1,2,4-triazole-1-methyl) benzene ligand, and (Mo$_3$O$_{10}$) is a trinuclear molybdate anion. The method of manufacturing the organic frame material having cobalt-containing isopoly-molybdic acid metal includes heating 2,3,5,6-tetrafluoro-bis (1,2,4-triazole-1-methyl) benzene, a cobalt salt, and sodium molybdate dihydrate in distilled water in a closed container. The synthesis method is simple with high yield and reproducibility. The organic frame material having cobalt-containing isopoly-molybdic acid metal can catalyze the bulk ring-opening polymerization of p-dioxanone in the absence of alcohol initiator. The resulting poly(p-dioxanone) has a weight average molecular weight exceeding 70,000, and the molecular distribution index of the poly(p-dioxanone) is smaller than 1.5. The poly(p-dioxanone) obtained by the method discussed in the present invention has great potential in the field of medical high polymer materials.

It should be noted that the above-mentioned embodiments are only for illustrating the technical solutions of the present invention and not for limiting, and although the present invention has been described in detail with reference to the further embodiments, it should be understood by those skilled in the art that modifications or equivalent substitutions may be made on the technical solutions of the present invention without departing from the spirit and scope of the technical solutions of the present invention, which should be covered by the claims of the present invention.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within ±10%, ±5%, ±1%, or ±0.5% of the average of the values.

What is claimed is:

1. An organic frame material having a cobalt containing isopoly-molybdic acid metal comprising:
 a three-dimensional network structure comprising cobalt ions coordinated with 2,3,5,6-tetrafluoro-bis (1,2,4-triazole-1-methyl) benzene ligands and trinuclear molybdate anions, the chemical formula of the three-dimensional network structure being [Co (tfbtb) (Mo$_3$O$_{10}$) (H$_2$O)],
 wherein tfbtb is a 2,3,5,6-tetrafluoro-bis (1,2,4-triazole-1-methyl) benzene ligand, and (Mo$_3$O$_{10}$) is a trinuclear molybdate anion.

2. The organic frame material of claim 1, wherein the three-dimensional network structure is a triclinic crystal system, the space group is P-1, the molecular formula is C$_{12}$H$_{10}$CoF$_4$Mo$_3$N$_6$O$_{11}$, the molecular weight is 827.94, the cell parameters are a =8.0162(5) Å, b=8.9177(8)Å, c=15.5957(10) Å, α=106.519(7)°, β=92.137(5)°, γ=99.520(6)°, and the cell volume is 1049.94(14)Å$^3$, Z=2.

3. A method of manufacturing the organic frame material of claim 1 comprising:
 providing a composition, the composition comprising a cobalt salt, sodium molybdate dihydrate, 2,3,5,6-tetrafluoro-bis (1,2,4-triazole-1-methyl) benzene and a solvent; and
 heating the composition to obtain the organic frame material having cobalt containing isopoly-molybdic acid metal.

4. The method of claim 3, wherein the cobalt salt is selected from the group consisting of one or more of cobalt chloride hexahydrate, cobalt acetate tetrahydrate, cobalt sulfate heptahydrate and cobalt nitrate hexahydrate.

5. The method of claim 3, wherein the solvent is water, and every 0.1 mmol of 2,3,5,6-tetrafluoro-bis (1,2,4-triazole-1-methyl) benzene corresponds to 3 to 10 ml of water.

6. The method of claim 3, wherein the heating has a heating temperature range between 120 and 160° C. and a heating time range between 12 and 36 hours.

7. A method of catalyzing a ring opening polymerization of p-dioxanone (PDO) for the preparation of poly(p-dioxanone) (PPDO) comprising:
 effecting a bulk ring opening polymerization on the organic frame material having cobalt containing isopoly-molybdic acid metal of claim 1 and PDO under a reaction temperature to obtain PPDO.

8. The method of claim 7, wherein the molar ratio between the organic frame material having cobalt containing isopoly-molybdic acid metal and the PDO is between 1:2000 and 1:8000.

9. The method of claim 7, wherein the weight average molecular weight of the PPDO is between 60,000 and 90,000, the molecular weight distribution index of the PPDO is between 1.3 and 1.5, and the PPDO is capable of being incorporated into medical polymer materials.

* * * * *